F. W. PFEIFFER.
BEAD MAKING TOOL.
APPLICATION FILED MAY 25, 1920.

1,375,318.

Patented Apr. 19, 1921.

Inventor
Frank W. Pfeiffer
By Attorney H. Anderson

UNITED STATES PATENT OFFICE.

FRANK W. PFEIFFER, OF PEEKSKILL, NEW YORK.

BEAD-MAKING TOOL.

1,375,318.  Specification of Letters Patent.  Patented Apr. 19, 1921.

Application filed May 25, 1920. Serial No. 384,194.

*To all whom it may concern:*

Be it known that I, FRANK W. PFEIFFER, a citizen of the United States, and resident of Peekskill, in the county of Westchester and State of New York, have invented certain new and useful Bead-Making Tools, of which the following is a specification.

This invention relates to the production of glass beads and has reference particularly to the saving of waste material. In the production of beads by winding molten glass upon a rotating wire upon which the glass assumes a globular form and so constitutes the bead, and each bead is cut off with a core of the wire through it, the wires originally about six inches long are manipulated by the fingers, and grows so short that it gets too hot to hold, so that a piece of wire one-and one-half to two inches long becomes a waste. The primary object of the invention is to eliminate that waste, although the invention is not limited to the handling of the short wires. The objects are attained by the means set forth in this specification and the accompanying drawings, in which like letters and numerals refer to similar parts in the several views.

Figure 1:
Figure 2:
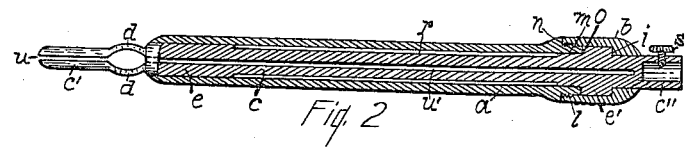
Figure 3:
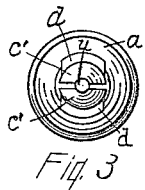
Figure 5:
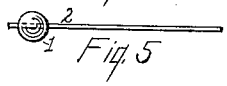
Figure 4:
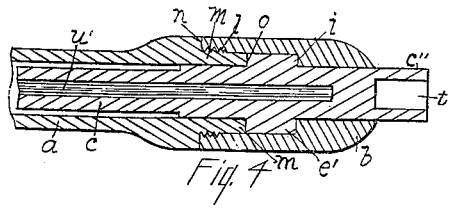
Figure 6:
Figure 7:

Figure 1 represents this tool for bead making of full size. Fig. 2 is a longitudinal section of Fig. 1. Fig. 3 is an enlarged view of the chuck end of the tool. Fig. 4 is an enlarged view of the coupling end of the tool. Figs. 5, 6 and 7 are representations of beads on differing lengths of wire.

The tool is composed of only three parts, a tubular handle $a$, a spindle $c$ longer than the handle and mostly inclosed within the handle, and a cap piece $b$, that forms a part of the handle. The tubular handle $a$ enlarged at the coupling end to form a shoulder $n$, Figs. 2 and 4, and adjacent to the shoulder on the extension $m$ is a screw thread $l$. The cap $b$ is made to screw upon the part $m$ and against the shoulder $n$, leaving a space within the cap between the end $o$ of the tube and a shoulder $i$ within the cap.

A spindle $c$ fits within the handle but is reduced in size between the ends, as at $r$, leaving a bearing surface $e$ on one end, and a collar $e'$ near the other end to fill the space in the cap with an extended bearing surface upon each side of the collar. The outer end $c''$ of the spindle projecting from the handle is adapted as a coupling for the attachment of a flexible drive shaft $s$, Fig. 1. A set screw $s'$ is a means for securing the flexible shaft in the socket coupling $t$.

The other end of the spindle $c$ is formed into a spring chuck $c'$, Figs. 1 and 2, Fig. 3 showing an enlarged view of the chuck end of the tool. The spindle is bored longitudinally as at $u'$ from its tip end to the shaft end. The tip or chuck end is split, as at $u$, and next the handle the parts are spread apart as at $d$, $d$, and the arched parts constitute springs, and the springs tend to close the split ends toward each other and being so adjusted that when a wire is between them, as in Fig. 1, the pressure is equally distributed throughout their length. There is no end pressure upon the wires, and the grip of the chuck is of a force like finger pressure.

In Fig. 1 the chuck is shown as holding a short wire with a bead 1 formed upon it. Fig. 5 represents a wire beaded by the tool that could not have been held in the fingers, and Figs. 6 and 7 show upon how short wires beads can be made by use of the tool. The hole $u'$ nearly through the handle admits of long wires being handled in the tool. The tool is to be driven by a flexible shaft from any suitable source of power. A high speed is not desirable, only a speed similar to that obtained by rolling the wire between the thumb and finger.

While the primary object of this invention is the utilization of what has heretofore been a waste, the tool can be made of a length to receive the full length of the wires commonly employed.

It is not intended to limit the form of the coupling end of the spindle to that shown at $c''$, and obviously some other form of chuck could be substituted for that shown at $c'$.

Having described my invention, what I claim and desire to secure by Letters Patent, is—

1. A tool for utilizing waste wire in bead making comprising a handle, a spindle in the handle, one end of the spindle forming a coupling for a flexible shaft connection, the other end of the spindle formed into a spring chuck.

2. The combination in a tool for making beads, of a handle, a cap secured on the handle forming a chamber for a spindle collar, a spindle within the handle, a collar on the spindle having a bearing within the said cap, the end of the spindle next the cap formed into a flexible shaft coupling, the other end of the spindle outside the handle bored and split to form a chuck, the split ends forming springs adjacent to the handle, and the spindle centrally bored to approximately the length of the handle.

3. The combination in a tool for making beads, of a handle, a cap on the handle, the cap forming a chamber within the cap, a spindle within the handle, a collar on the spindle filling said chamber in the cap, one end of the spindle extended to form a coupling, the other end of the spindle formed to constitute a chuck, the spindle centrally bored in line with the hole in the chuck.

FRANK W. PFEIFFER.